United States Patent [19]

Rayburn

[11] Patent Number: 4,849,853
[45] Date of Patent: Jul. 18, 1989

[54] CAPACITIVE STRUCTURE

[75] Inventor: Charles C. Rayburn, Forest, Va.

[73] Assignee: Illinois Tool Works Inc., Chicago, Ill.

[21] Appl. No.: 180,144

[22] Filed: Apr. 11, 1988

[51] Int. Cl.[4] .......................... H01G 1/14; H01G 7/00; H01G 4/38

[52] U.S. Cl. .................................. 361/309; 29/25.42; 361/328

[58] Field of Search ............... 361/306, 308, 309, 310, 361/320, 321, 323, 328, 329, 402, 403, 433 C; 29/25.42

[56] References Cited

U.S. PATENT DOCUMENTS

| | | | |
|---|---|---|---|
| 3,284,684 | 11/1966 | Gaenge | 361/309 |
| 3,590,348 | 6/1971 | Bertics | 361/308 |
| 4,008,514 | 2/1977 | Elderbaum | 29/25.42 |
| 4,168,520 | 9/1979 | Coleman et al. | 361/321 X |
| 4,434,452 | 2/1984 | Hamabe et al. | 361/309 X |

Primary Examiner—Donald A. Griffin
Attorney, Agent, or Firm—Thomas Buckman

[57] ABSTRACT

Improvements in a capacitive structure comprising a plurality of capacitive layers in stacked relation to one another with indentations along their edges. Similar upper and lower dielectric covers with beveled portions along their edges cover the uppermost and lowermost capacitive layers. Along each edge, a mass of conductive material provides electrical connections and covers the beveled portions of the respective covers as well as the edges of the respective covers and of the capacitive layers, so as to lock the respective covers onto the capacitive layers. The respective covers are provided with parallel grooves, which may be washed or flushed, as by means of pressurized air, so as to remove contaminants.

9 Claims, 1 Drawing Sheet

U.S. Patent
Jul. 18, 1989
4,849,853
FIG-1-
PRIOR ART
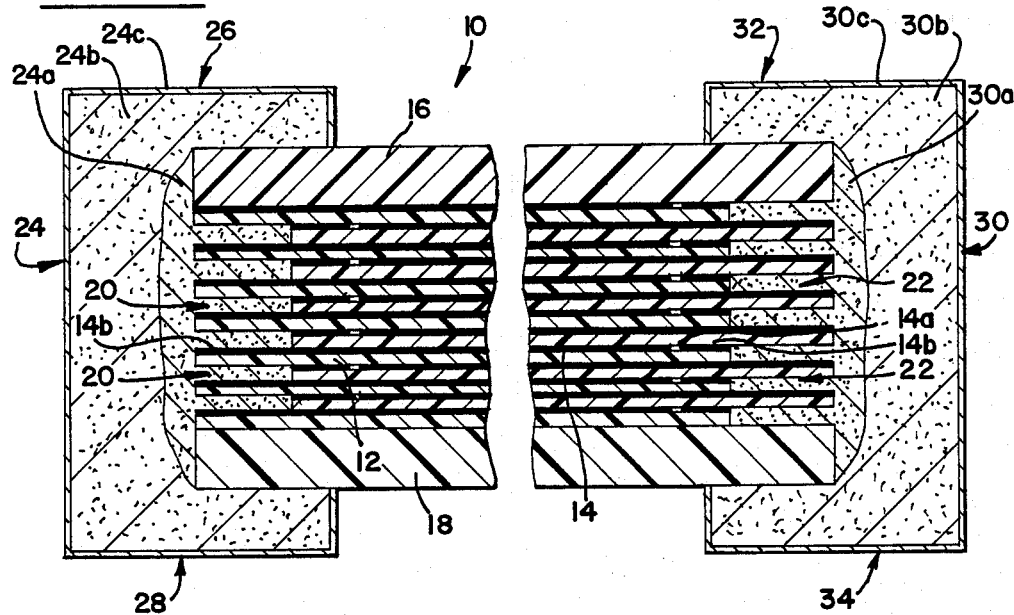
FIG-2-
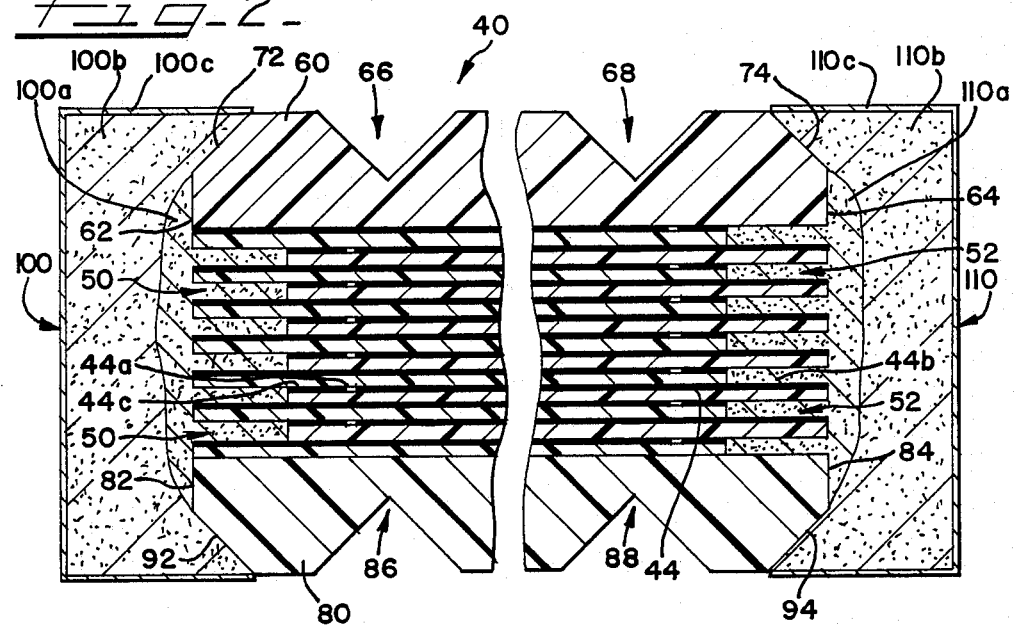

CAPACITIVE STRUCTURE

BACKGROUND OF THE INVENTION

This invention pertains to an improved capacitive structure of a type comprising a group of capacitive layers, each of which includes a dielectric substrate and a metallized area on one surface of the dielectric substrate and which are arranged such that the metallized areas on alternate layers extend to opposite edges of the capacitive structure, and opposed masses of conductive material, each of which covers one such edge of the capacitive structure and provides electrical connections to the metallized areas extending to the same edge. A capacitive property is exhibited where the metallized areas overlie one another.

Capacitive structures of the type noted above are exemplified in U.S. Pat. No. 4,462,062, No. 4,488,340, and No. 4,531,268. The patents disclose that such a capacitive structure may be advantageously made by winding, in overlying relation on a drum, two webs of polymeric film, each providing a dielectric substrate. Each web of such film has a metallized coating on its upper surface, except for narrow, longitudinal, demetallized zones, which may be scribed by laser means, and which divide the metallized coating into a relatively wide metallized area extending to and along one edge and a relatively narrow metallized strip extending to and along the other edge. The webs, which are of equal width, are offset laterally such that, as the webs are slit into parallel ribbons of uniform width before being wound on the drum, alternate ones of the successive layers of the overlying ribbons have their edges offset laterally in relation to the remaining layers. A conductive, metallic mass, which may be applied by a metal-spraying process, covers each edge of the overlying ribbons so as to provide electrical contacts to and between the metallized areas extending to and along such edge. The resultant structure, which is called a rope because it has a tendency to be somewhat limp, is compressed at an elevated temperature so as to form a more rigid structure, which is called a stick. The stick is sawed into discrete capacitors, which may be called chip capacitors. In each capacitor, the conductive, metallic masses serve as electrodes, and a capacitive property is exhibited where the relatively wide metallized areas of the successive layers overlie one another.

It is known for an upper cover and a lower cover, each being a single, thicker plate of dielectric material, to cover the top and bottom surfaces of the group of capacitive layers and for each of the conductive, metallic masses to extend above the upper cover and below the lower cover so as to form respective upper and lower flanges, which bond the covers to the group of capacitive layers. The upper and lower covers provide mechanical and electrical protection to the capacitive structure. Moreover, if the capacitive structure is surface-mounted to a supporting substrate, the lower flanges elevate the lower cover in relation to the supporting substrate. Hence, the lower flanges may also be called stand-off feet or mounting feet. Typically, the capacitive layers and cover plates are built-up to a standardized thickness, e.g., 0.08 inch.

For further background, reference may be had to U.S. Pat. No. 3,670,378 and U.S. Pat. No. 4,229,865, which disclose other examples of capacitive structures of the type noted above.

Although capacitive structures of the type noted above as known heretofore have performed well in many applications, there has been a need, to which this invention is addressed, for improvements in such structures.

SUMMARY OF THE INVENTION

This invention provides an improved capacitive structure of the type noted above.

Broadly, this invention may be embodied in a capacitive structure comprising a plurality of capacitive layers in stacked relation to one another. Each layer has opposite first and second edges. Each layer includes a dielectric substrate and a metallized area, which covers a major portion of one surface of the dielectric substrate. The metallized areas on alternative ones of the capacitive layers extend to opposite edges. Also, the first edges of alternative ones of the capacitive layers extend beyond the first edges of the remainder of such layers and the second edges of alternative ones of the capacitive layers extend beyond the second edges of the remainder of such layers, so as to form indentations along the first and second edges of such layers.

Moreover, the capacitive structure comprises an upper dielectric cover and a lower dielectric cover. The upper dielectric cover covers the uppermost of the capacitive layers. The lower dielectric cover covers the lowermost of the capacitive layers. Each cover has opposite first and second edges corresponding to the first and second edges of such layers.

Furthermore, the capacitive structure comprises a first mass of conductive material, which covers the first edges of the capacitive layers, and a second mass of conductive material, which covers the second edges of the conductive layers. The first mass of conductive material extends into the indentations formed along the first edges of such layers, so as to provide electrical connections to and between the metallized areas extending to the first edges of such layers, and so as to lock the capacitive layers to one another along the first edges of such layers. The second mass of conductive material extends into the indentations formed along the second edges of such layers, so as to provide electrical connections to and between the metallized areas extending to the second edges of such layers, and so as to lock the capacitive layers to one another along the second edges of such layers.

In accordance with a principal feature of this invention, each cover of the upper and lower dielectric covers has beveled portions along its first and second edges. Moreover, the first mass of conductive material covers the beveled portions along the first edges of the respective covers, so as to lock the respective covers onto the conductive layers along the first edges of such layers. Likewise, the second mass of conductive material covers the beveled portions along the second edges of the respective covers, so as to lock the respective covers onto the conductive layers along the second edges of such layers.

Preferably, each mass of conductive material includes an outer layer, which may be a tin-based layer applied by dipping. Additionally, each mass of conductive material may include an inner, aluminum-based layer and an intermediate, copper-based layer, each applied by spraying.

In a preferred embodiment of this invention, each mass of conductive material has an outer layer, as discussed above. Moreover, each mass of conductive material is configured such that, when the capacitive structure stands on a supporting surface, such as a circuit board or other supporting substrate, the lower dielectric cover stands off the supporting surface at each edge of such cover by a distance that is approximately equal to the thickness of the outer layer at such edge. Thus, the lower dielectric cover stands off the supporting surface at the first edge of such cover by a distance that is approximately equal to the thickness of the outer layer of the first mass of conductive material. Also, the lower dielectric cover stands off the supporting surface at the second edge of such cover by a distance that is approximately equal to the thickness of the outer layer of the second mass of conductive material.

In accordance with an additional feature of this invention, the lower dielectric cover of the preferred embodiment noted above may have at least one groove, preferably a pair of grooves, the first and second edges of the lower dielectric layer and the groove or grooves being substantially parallel to one another. Preferably, each groove is V-shaped.

If the upper dielectric cover is similarly provided with a groove or grooves, either dielectric cover may be used as the lower dielectric cover, since inversion of the capacitive layers 42 does not have any adverse effect on the capacitive property of the capacitive structure 40.

The groove or grooves in the lower dielectric cover may be washed or flushed, as by means of pressurized air, so as to remove contaminants that might tend to cause a short circuit if not removed.

The groove or grooves leave substantial areas on the cover or covers where a vacuum "pick and place" probe of a robotic device can be applied, where upper and lower platens can be applied for lamination of the capacitive structure, and where indicia can be applied.

This invention allows thick covers to be used, which enhance the rigidity and structural integrity of the capacitive structure and of discrete capacitors made from the capacitive structure.

These and other objects, features, and advantages of this invention will be better understood from the following description of the preferred embodiment of this invention, with reference to the accompanying drawings.

BRIEF DESCRIPTION OF THE DRAWINGS

FIG. 1 is a greatly enlarged, cross-sectional view of a capacitive structure constituting prior art, a central portion of such structure being omitted for illustration purposes.

FIG. 2 is a similarly enlarged, cross-sectional view of a capacitive structure constituting a preferred embodiment of this invention, a central portion of such structure being omitted for illustration purposes.

DETAILED DESCRIPTION OF PREFERRED EMBODIMENT

Before a detailed description is given of a capacitive structure constituting a preferred embodiment of this invention, it will be useful to consider a capacitive structure exemplifying prior art, as shown in FIG. 1.

As shown in FIG. 1, a capacitive structure 10 comprises a group of capacitive layers 12, each including a dielectric substrate with metallized areas 14 covering the upper surface of the dielectric substrate, except for narrow, longitudinal, demetallized zones 14a dividing the metallized surface 14 into a relatively wide area 14b and a relatively narrow strip 14c. Alternative ones of the capacitive layers 12, which are of equal width, are offset laterally in relation to each other such that alternatives ones of the capacitive layers 12 have their edges offset laterally in relation to the remaining layers. Thus, indentations 20 are formed along the left edges of the capacitive layers 12, and indentations 22 are formed along the right edges of the capacitive layers 12. An upper cover 16 and a lower cover 18, each being a single, thicker (e.g. 5 mil) plate of dielectric material, are provided respectively at the top and bottom surfaces of the group of capacitive layers 12. A conductive, metallic mass 24, which includes an inner, aluminum-based layer 24a that may be applied by a metal-spraying technique and then cured, an intermediate, copper-based layer 24b that also may be applied by a metal-spraying technique, and an outer, tin-based layer 24c that may be applied by a dipping technique, covers the left edges of the capacitive layers 12 and covers the left edges of the capacitive layers 12 and covers the left edges of the upper cover 16 and the lower cover 18. The mass 24 extends above the upper cover 16, so as to form an upper flange 26 bonding the upper cover 16 to the capacitive layer 12. The mass 24 extends beneath the lower cover 18, so as to form a lower flange 28 bonding the lower cover 18 to the capacitive structure 10. Similarly, a conductive metallic mass 30, which includes similar inner, intermediate, and outer layers 30a, 30b, and 30c respectively, covers the right edges of the capacitive layers as well as the right edges of the upper cover 16 and the lower cover 18. The mass 30 extends similarly above the upper plate 16, so as to form an upper flange 32, and below the lower cover 18, so as to form a lower flange 34. The upper flange 32 and the lower flange 34 bond the cover plates 16, 18, to the capacitive layers 12 at the right side of the capacitive structure 10. Each of the lower flanges 28, 34, also serves as a stand-off foot, which elevates the cover plate 18 in relation to a circuit board or other substrate (not shown) to which the capacitive structure 10 may be surface-mounted.

The capacitive structure 10 has several disadvantages, which are overcome by this invention.

One disadvantage is that the stand-off feet are formed by spraying copper onto the cover plates 16, 18, while the capacitive structure 10 remains in the form of a stick, i.e., before the capacitive structure 10 is sawed into discrete capacitors. Manual labor is employed to load each stick, to turn each stick over for spraying on its upper and lower surfaces, and to unload each stick.

Another disadvantage is that masking tape must be applied to prevent the copper spray from depositing on the cover plates 16, 18, between the stand-off feet, which also serve as the electrical terminals. After spraying, the type must be manually removed. Further, the tape is expensive.

A further disadvantage is that, as the copper spray strikes the dielectric surfaces of the cover plates 16, 18, some particles stick, while others bounce off. Once a spray particle sticks, the spray nucleates from that particle. The effect is to build up a rough surface on the finished stand-off foot.

In contrast with the capacitive structure 10 shown in FIG. 1 and described above, FIG. 2 shows a capacitive structure 40 constituting a preferred embodiment of this invention.

The capacitive structure 40 comprises a group of capacitive layers 42, in stacked relation to one another, which are similar to the capacitive layers 12 of the capacitive structure 10 described above. Each capacitive layer 42 of the capacitive structure 40 has a metallized upper surface 44, which is divided by a narrow, longitudinal, demetallized zone 44a into a relatively wide metallized area 44b and a relatively narrow metallized strip 44c. The demetallized zone 44a may be scribed by laser means (not shown) in a known manner. The metallized areas 44b on alternate ones of the capacitive layers 42 extend to opposite edges of the capacitive structure 40.

Moreover, the left edges of alternative ones of the capacitive layers 42 extend beyond the left edges of the remainder of the capacitive layers 42 and the right edges of alternative ones of the capacitive layers 42 extend beyond the right edges of the remainder of the capacitive layers 42, so as to form indentations 50 between every third one of the capacitive layers 42 along the left edges of the capacitive layers 42, and so as to form indentations 52 between every third one of the capacitive layers 42 along the right edges of the capacitive layers 42. Preferably, the indentations 50 are bounded partially by strip-like portions of the metallized areas 44b extending to the left edge of the capacitive structure 40, and the indentations 52 are bounded partially by strip-like portions of the metallized areas 44b extending to the right edge of the capacitive structure 40.

An upper dielectric cover 60 covers the uppermost of the capacitive layers 42. The left and right edges of the cover 60 correspond to the right and left edges of the capacitive layers 42. Thus, the left edge 62 of the cover 60 lies in a vertical plane with the left edges of whichever ones of the capacitive layers 42 extend beyond the left edges of the remainder of the capacitive layers 42. Also, right edge 64 of the cover 60 cover lies in a vertical plane with the right edges of whichever ones of the capacitive layers 42 extend beyond the right edges of the remainder of the capacitive layers 42. Furthermore, the cover 60 is formed at its upper surface with a pair of V-shaped grooves 66 and 68 respectively, which are parallel to the right and left edges 62 and 64 respectively. A substantial area 70 is left between the grooves 66 and 68. As shown, the cover 60 has a beveled portion 72 along the left edge 62 and a beveled portion 74 along the right edge 64.

A lower dielectric cover 80 covers the lowermost of the capacitive layers 42. The left and right edges of the cover 80 correspond to the left and right edges of the capacitive layers 42. Thus, the left edge 82 of the cover 80 lies in a vertical plane with the left edges of whichever ones of the capacitive layer 42 extend beyond the left edges of the remainder of the capacitive layers 42. Also, the right edge 84 of the cover 80 lies in a vertical plane with the right edges of whichever ones of the capacitive layers 42 extend beyond the right edges of the remainder of the capacitive layers 42. Furthermore, the cover 80 is formed at its lower surface with a pair of V-shaped grooves 86 and 88 respectively, which are parallel to the right and left edges 82 and 84 respectively. A substantial area 90 is left between the grooves 86 and 88. As shown, the cover 80 has a beveled portion 92 along the left edge 82 and a beveled portion 94 along the right edge 84.

Along the left edges of the capacitive layers 42 and of the upper and lower dielectric covers 60 and 80 respectively, a mass 100 of conductive material is applied. The mass 100 comprises an inner, aluminum-based layer 100a, which may be applied by a spraying technique and then cured, an intermediate, copper-based layer 100b, which also may be applied by a spraying technique, and an outer, tin-based layer 100c, which may be applied by a dipping technique. As shown, the inner layer 100a, which substantially fills the indentations 50 along the left edges of the layers 42, covers the left edge 62 of the upper dielectric cover 60 and the left edge 82 of the lower dielectric cover 80. Moreover, the intermediate layer 100b covers the inner layer 100a, the beveled portion 72 along the left edge 72 of the upper dielectric layer 60, and the beveled portion 92 along the left edge 82 of the lower dielectric cover 80, so as to lock the capacitive layers 42 to one another along the left edges of the capacitive layers 42. Moreover, the outer layer 100c covers the intermediate layer 100b.

Along the right edges of the capacitive layers 42 and of the upper and lower dielectric covers 60 and 80 respectively, a mass 110 of conductive material is applied. The mass 110 comprises an inner, aluminum-based layer 110a, which may be applied by a spraying technique and then cured, an intermediate, copper-based layer 110b, which also may be applied by a spraying technique, and an outer tin-based layer 110c, which may be applied by a dipping technique. As shown, the inner layer 110a, which substantially fills the indentations 52 along the right edges of the capacitive layers 42, covers the right edge 64 of the upper dielectric cover 60 and the right edge 84 of the lower dielectric cover 80. Moreover, the intermediate layer 110b covers the inner layer 110a, the beveled portion 74 along the right edge 64 of the upper dielectric cover 60, and the beveled portion 94 along the right edge 84 of the upper dielectric cover 80, so as to lock the capacitive layers 42 to one another along the right edges of the capacitive layers 42. Moreover, the outer layer 100c covers the intermediate layer 100b.

As shown, the upper and lower dielectric covers 60 and 80 respectively are essentially identical to each other. Thus, the grooves 66, 68, 86, and 88 respectively are parallel to each other. Advantageously, therefore, either dielectric cover may be used as the lower dielectric cover, since inversion of the capacitive layers 42 does not have any adverse effect on the capacitive property of the capacitive structure 40.

Thus, the mass 100 of conductive material and the mass 110 of conductive material are substantially identical to each other. Known spraying and curing techniques, which require fixtures of known types, may be employed to apply the inner layers 100a and 110a respectively and to apply the intermediate layers 100b and 110b respectively. Known dipping techniques may be employed to apply the outer layers 100c and 110c respectively. As shown, the outer layers 100c and 110c respectively are thin, for reasons to be later discussed.

Since the indentations 50, 52, are bounded partially by strip-like portions of the metallized areas 44b extending to the respective edges of the capacitive structure 40, good electrical contact is achieved with the respective masses 100, 110. Hence, the capacitive layers 42 exhibit a capacitive property wherever the relatively wide metallized areas 44b having electrical connections to the conductive mass 110 overlie the relatively wide metallized areas 44b having electrical connections to the conductive mass 100. The metallic strips 44c do not exhibit a capacitive property. Electrical leads (not shown) may be soldered to the conductive masses 100, 110, which serve as electrodes.

As shown, each of the conductive masses 100, 110, is configured such that, when the capacitive structure 40 stands on a circuit board or other supporting substrate (not shown) to which the capacitive structure 40 may be surface-mounted, the lower dielectric cover 80 stands off the supporting substrate at the left edge 82 by a distance that is approximately equal to the thickness of the outer layer 100c of the conductive mass 100 at the left edge 82 and at the right edge 84 by a distance that is approximately equal to the thickness of the outer layer 110c of the conductive mass 110 at the right edge 84.

The grooves 86, 88, in the lower dielectric cover 80 may be washed or flushed, as by means of pressurized air, so as to remove contaminants that might tend to cause a short circuit if not removed. Although a single groove would suffice, a second groove provides added protection against a short circuit.

A vacuum "pick and place" probe of a robotic device can be applied either to the substantial area 70 between the grooves 66, 68, of the dielectric cover 60 or to the substantial area 90 between the grooves 86, 88, of the dielectric cover 80, whichever is used as the upper dielectric cover. Either dielectric cover may be used as the upper dielectric cover, since inversion of the capacitive layers 42 does not have any adverse effect on the capacitive property of the capacitive structure 40.

If lamination of the capacitive structure 40 is desired, upper and lower platens (not shown) may be applied respectively to the substantial area 70 between the grooves 66, 68, of the upper dielectric cover 60 and to the substantial area 90 between the grooves 86, 88 of the lower dielectric cover 80. Alternatively, since the outer layer 100c of the conductive mass 100 and the outer layer 110c of the conductive mass 110 are thin, upper and lower platens (not shown) may be applied respectively to the upper and lower surfaces of the capacitive structure 40, as a whole. In either case, the grooves being V-shaped enables laminating pressure (e.g., 300 psig) to be substantially uniformly applied across the upper and lower dielectric covers.

A carrier strip (not shown) can be positioned beneath the capacitive structure 40, so as to facilitate sawing of the capacitive structure 40 into discrete capacitors. Because of the aforementioned configuration of the conductive masses 100, 110, there is little flexure of the capacitive structure 40 during the sawing operation. Indicia (not shown) may be applied to the substantial area 80 between the grooves 66, 68, of the upper dielectric cover 60, to the substantial area 90 between the grooves 86, 88, of the lower dielectric cover 80, or to both areas.

As mentioned, this invention allows each of the dielectric covers 60, 80, to be thick, (e.g., 14 mil) so as to enhance the rigidity, structural integrity, and thermal stability of the capacitive structure 40 and of discrete capacitors made from the capacitive structure 40.

I claim:

1. In a capacitive structure comprising:
   (a) a plurality of capacitive layers in stacked relation to one another, each having opposite first and second edges, and each including a dielectric substrate and a metallized area, which covers a major portion of one surface of the dielectric substrate, the metallized areas on alternative ones of the capacitive layers extending to opposite edges, the first edges of alternative ones of the capacitive layers extending beyond the first edges of the remainder of the capacitive layers and the second edges of alternative ones of the capacitive layers extending beyond the remainder of the capacitive layers so as to form indentations along the first and second edges of the capacitive layers;
   (b) an upper dielectric cover, which covers the uppermost of the capacitive layers, and which has opposite layers, and which has opposite first and second edges corresponding to the first and second edges of the capacitive layers;
   (c) a lower dielectric cover, which covers the lowermost of the capacitive layers, and which has opposite frist and seconrd edges corresponding to the first and second edges of the capacitive layers;
   (d) a first mass of conductive material, which covers the first mass of the capacitive layers, and which extends into the indentations form along the first edges of the capacitive layers, so as to provide electrical connections to and between the metallized areas extending to the first edges of the capacitive layers, and so as to locik the capacitive layers to one another along the first edges of the capacitive layers; and
   (e) a second mass of conductive materials, which covers the second edges of the capacitive layers, and which extends into the indentations formed along the second layers, so as to provide electrical connections to and between the metallized areas extending to the second edges of the capacitive layers, and so as to lock the capacitive layers to one another along the second edges of the capacitive layers;

an improvement wherein each cover of the upper and lower dielectric covers has beveled portions along the first and second edges of such cover, wherein the first mass of conductive material covers the beveled portions along the first edges of the upper and lower dielectric covers, so as to lock the upper and lower dielectric covers onto the conductive layers along the first edges of the conductive layers, and wherein the second mass of conductive material covers the beveled portions along the second edges of the upper and lower dielectric covers, so as to lock the upper and lower dielectric covers onto the conductive layers along the second edges of the conductive layers, wherein each mass of conductive material includes an outer layer and is configured such that, when the capacitive structure stands on a supporting surface, the lower dielectric cover stands off the supporting surface at the first edge of the lower dielectric cover by a distance that is approximately equal to the thickness of the outer layer of the first mass of conductive material and at the second edge of the lower dielectric cover by a distance that is approximately equal to the thickness of the outer layer of the second mass of conductive material.

2. The improvement of claim 1 wherein each mass of conductive material includes an inner, aluminum-based layer, which is applied by spraying, and an intermediate, copper-based layer, which is applied by spraying, and wherein the outer layer of each mass of conductive material is a tin-based layer, which is applied by dipping.

3. The improvement of any of claims 1, wherein the lower dielectric layer has at least one groove, and wherein the first and second edges of the lower dielectric layer and the groove are substantially parallel to one another.

4. The improvement of claim 3 wherein the groove is V-shaped.

5. The improvement of claim 3 wherein the upper dielectric layer has at least one groove, which is parallel to the first and second edges of the upper dielectric layer and to the first and second edges of the lower dielectric cover and the groove of the lower dielectric cover.

6. The improvement of claim 5 wherein the groove is V-shaped.

7. The improvement of claim 3 wherein the lower dielectric layer has two grooves, which are parallel to each other and to the first and second edges of the lower dielectric layer.

8. The improvement of claim 7 wherein each of the grooves is V-shaped.

9. The improvement of any of claim 1, wherein the lower dielectric layer has two V-shaped grooves, which are parallel to each other and to the first and second edges of the lower dielectric cover, wherein the upper dielectric layer has two V-shaped grooves, which are parallel to each other, to the first and second edges of the upper dielectric layer, and to the first and second edges of the lower dielectric cover and the grooves of the lower dielectric cover.

* * * * *